United States Patent
Wei

(10) Patent No.: US 9,012,859 B2
(45) Date of Patent: Apr. 21, 2015

(54) TILED X-RAY IMAGER PANEL AND METHOD OF FORMING THE SAME

(75) Inventor: Ching-Yeu Wei, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 235 days.

(21) Appl. No.: 13/475,537

(22) Filed: May 18, 2012

(65) Prior Publication Data

US 2013/0306875 A1    Nov. 21, 2013

(51) Int. Cl.
*G01T 1/20*        (2006.01)

(52) U.S. Cl.
CPC ..................... *G01T 1/2018* (2013.01)

(58) Field of Classification Search
CPC ..................................... G01T 1/2018
See application file for complete search history.

(56) References Cited

U.S. PATENT DOCUMENTS

| | | | |
|---|---|---|---|
| 4,843,035 A * | 6/1989 | Takashima | 438/51 |
| 6,180,944 B1 | 1/2001 | Robinson et al. | |
| 6,403,964 B1 | 6/2002 | Kyyhkynen | |
| 2002/0168793 A1 * | 11/2002 | Izumi et al. | 438/73 |
| 2003/0107804 A1 | 6/2003 | Dolgoff | |
| 2003/0169847 A1 | 9/2003 | Karellas et al. | |
| 2003/0200655 A1 | 10/2003 | Vafi et al. | |
| 2004/0120453 A1 | 6/2004 | Vafi et al. | |
| 2004/0245474 A1 * | 12/2004 | Vieux et al. | 250/370.11 |
| 2005/0098732 A1 | 5/2005 | Liu et al. | |
| 2010/0255629 A1 | 10/2010 | Spartiotis et al. | |
| 2010/0291726 A1 * | 11/2010 | Vieux et al. | 438/59 |
| 2011/0222659 A1 | 9/2011 | Jorritsma et al. | |

OTHER PUBLICATIONS

Fornaini, A. et al., "A Tiled Array of Hybrid Pixel Detectors for X-Ray Imaging", Nuclear Science, IEEE Transaction, Issue Date: Aug. 2004, on pp. 1824-1828, vol. 51, Issue: 4, ISSN: 0018-9499.

* cited by examiner

*Primary Examiner* — Constantine Hannaher
(74) *Attorney, Agent, or Firm* — Fletcher Yoder, P.C.

(57) ABSTRACT

A tiled imager panel is disclosed. In certain embodiments, the tiled imager panel is formed from separate imager chips that are mechanically tiled together so as to minimize the gap between the tiled imager chips. In addition, in certain embodiments, a scintillator material associated with the tiled imager panel is in a hermetically sealed environment so as to be protected from moisture.

19 Claims, 18 Drawing Sheets

TILED X-RAY IMAGER PANEL AND METHOD OF FORMING THE SAME

BACKGROUND

Non-invasive imaging technologies allow images of the internal structures of a subject (e.g., a patient or object) to be obtained without performing an invasive procedure on the patient or object. Non-invasive imaging systems may operate based on the transmission and detection of radiation through or from a subject of interest (e.g., a patient or article of manufacture). For example, X-ray based imaging techniques (such as mammography, fluoroscopy, computed tomography (CT), and so forth) typically utilize an external source of X-ray radiation that transmits X-rays through a subject and a detector disposed opposite the X-ray source that detects the X-rays transmitted through the subject. Other radiation based imaging approaches, such as single photon emission computed tomography (SPECT) or positron emission tomography (PET) may utilize a radiopharmaceutical that is administered to a patient and which results in the emission of gamma rays from locations within the patient's body. The emitted gamma rays are then detected and the gamma ray emissions localized.

Thus, in such radiation-based imaging approaches, the radiation detector is an integral part of the imaging process and allows the acquisition of the data used to generate the images of interest. In certain radiation detection schemes, the radiation may be detected by use of a scintillating material that converts the higher energy gamma ray or X-ray radiation to optical light photons (e.g., visible light), which can then be detected by photodetector devices, such as photodiodes. However, the scintillating material may be susceptible to degradation when exposed to moisture or other environmental conditions.

Such scintillator degradation may be an issue in contexts where a flat panel detector is to be used, such as in general X-ray radiography applications, C-arm applications, and so forth. In particular, to construct flat-panels of a desired size, it may be necessary to combine several smaller panels so as to form the desired larger panel assembly. Such assemblies, however, may be susceptible to encroachment by moisture or other environmental factors. As a result, a large-panel assembly formed using smaller imager panels may eventually be reduced in effectiveness due to encroachment of moisture or other environmental factors into the larger assembly.

BRIEF DESCRIPTION

In accordance with one embodiment, a method is provided for manufacturing a tiled detector panel. The method includes positioning imager chips face-down in a tiled arrangement. A epoxy is applied on a back surface of the imager chips along a perimeter and internal seams of the tiled arrangement of imager chips. A substrate is applied to the epoxy on the back surface of the imager chips. A ring of epoxy is applied on a front surface of the imager chips. A scintillator material is applied on the front surface of the imager chips. A face plate is applied to the ring of epoxy to form a sealed environment containing the scintillator material.

In accordance with a further embodiment, a method is provided for manufacturing a tiled detector panel. The method includes positioning imager chips face-up in a tiled arrangement. A epoxy is applied on a substrate at locations corresponding to a perimeter and internal seams associated with the tiled arrangement of imager chips. The tiled arrangement of imager chips is applied to the epoxy on the substrate such that the perimeter and internal seams of the tiled arrangement of imager chips are positioned on the epoxy. A ring of epoxy is applied on a front surface of the imager chips. A scintillator material is applied on the front surface of the imager chips. A face plate is applied to the ring of epoxy to form a sealed environment containing the scintillator material.

In accordance with another embodiment, a detector panel is provided. The detector panel includes a tiled arrangement of imager chips, the imager chips comprising a front surface and a back surface. The detector panel also includes a epoxy applied: to the back surface of the tiled arrangement of imager chips at the seams between the imager chips; on the back surfaces of the imager chips at least partially along a perimeter of the tiled arrangement of imager chips; and on the front surfaces of the imager chips in a ring about the perimeter of the tiled arrangement of imager chips. The detector panel also includes a substrate attached to the tiled arrangement of imager chips by the epoxy applied to the back surfaces of the imager chips and a face plate attached to the tiled arrangement of imager chips by the ring of epoxy applied to the front surfaces of the imager chips. The face plate, the ring of epoxy, the epoxy applied to the seams, and the imager chips form a sealed environment. The detector panel also includes a scintillator material deposited on the front surface of the imager chips within the sealed environment.

BRIEF DESCRIPTION OF THE DRAWINGS

These and other features, aspects, and advantages will become better understood when the following detailed description is read with reference to the accompanying drawings in which like characters represent like parts throughout the drawings, wherein.

DETAILED DESCRIPTION

The present disclosure relates to radiation detector assemblies formed using multiple smaller imager panels. In certain embodiments, detector panel assemblies that are sealed relative to environmental factors, such as moisture and humidity, are discussed along with the manufacture of such assemblies. As a result, the detector assemblies discussed herein are less susceptible to degradation of the scintillator material than other assembled detector panels. In other embodiments, such as where a non-hygroscopic X-ray scintillator is employed, the detector panel assembly need not be entirely sealed to environmental factors, such as moisture.

It should be noted that the present approaches may be utilized in a variety of imaging contexts, such as in medical imaging, product inspection for quality control, and for security inspection, to name a few. However, for simplicity, examples discussed herein relate generally to medical imaging, particularly radiation-based imaging techniques, such as: conventional X-ray radiography, fluoroscopy, mammography, tomosynthesis, C-arm angiography, single-photon emission computed tomography (SPECT), and so forth. However, it should be appreciated that these examples are merely illustrative and may be discussed merely to simplify explanation and to provide context for the examples discussed herein. That is, the present approaches may be used in conjunction with any of the disclosed imaging technologies as well other suitable radiation-based approaches and in contexts other than medical imaging. Specifically, FIGS. 1 and 2 discuss generalized embodiments of medical imaging systems that may utilize a radiation detector panel assembly, as discussed herein, with FIG. 1 being directed towards a general imaging system and FIG. 2 being directed towards an X-ray imaging system such as a radiography or C-arm imaging system.

Figure 1:
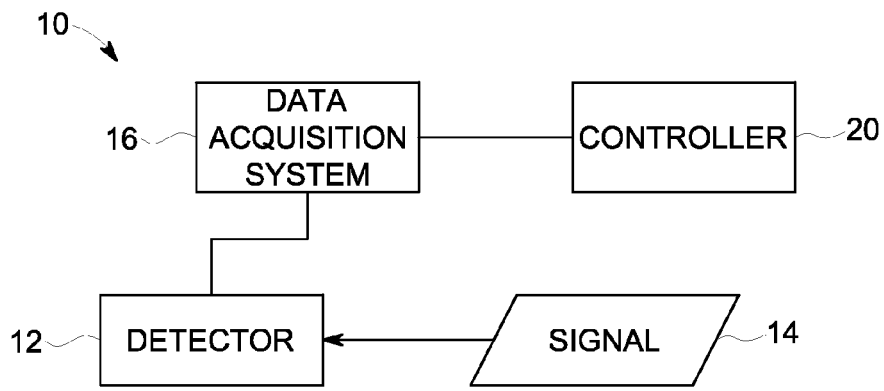
FIG. 1 is a block diagram illustrating an embodiment of a general imaging system, in accordance with an aspect of the present disclosure.

With the foregoing in mind, FIG. 1 provides a block diagram illustration of a generalized imaging system 10. The imaging system 10 includes a detector assembly 12 for detecting a signal 14, such as emitted gamma rays or transmitted X-rays. The detector assembly 12 may be composed of multiple, smaller panels, and may generate electrical signals in response to incident radiation on the detector assembly 12. The signal 14 may be generated by a radiation source controlled in conjunction with the imaging system 10 or may be generated in response to the radioactive decay of a radiopharmaceutical administered to a patient.

The detector assembly 12 generates electrical signals in response to the detected radiation, and these electrical signals are sent through their respective channels to a data acquisition system (DAS) 16. Once the DAS 16 acquires the electrical signals, which may be analog signals, the DAS 16 may digitize or otherwise condition the data for easier processing. For example, the DAS 16 may filter the image data for noise or other image aberrations, and so on. The DAS 16 then provides the data to a controller 20 to which it is operatively connected. The controller 20 may be an application-specific or general purpose computer with appropriately configured software. The controller 20 may include computer circuitry configured to execute algorithms such as imaging protocols, data processing, diagnostic evaluation, and so forth. As an example, the controller 20 may direct the DAS 16 to perform image acquisition at certain times, to filter certain types of data, and the like. Additionally, the controller 20 may include features for interfacing with an operator, such as an Ethernet connection, an Internet connection, a wireless transceiver, a keyboard, a mouse, a trackball, a display, and so on.

Figure 2:
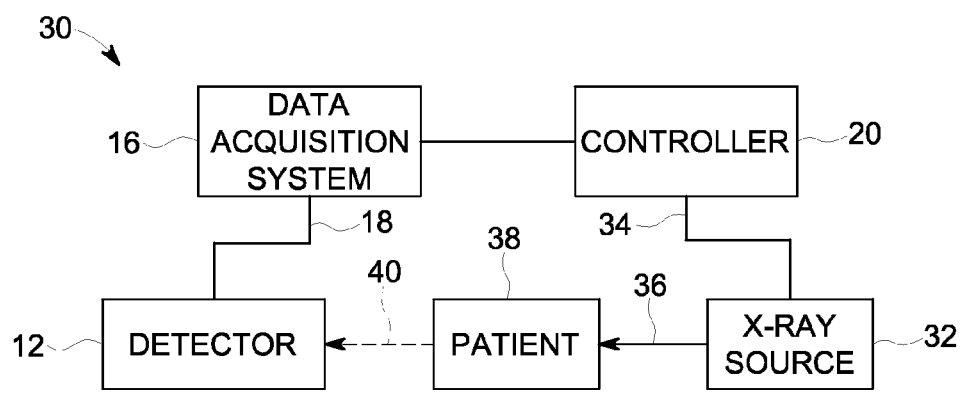
FIG. 2 is a block diagram illustrating an embodiment of an X-ray imaging system, in accordance with an aspect of the present disclosure.

Turning to FIG. 2, a block diagram is depicted that illustrates an X-ray imaging system 30 that may employ a detector assembly in accordance with the present disclosure. The X-ray imaging system 30 may be an inspection system, such as for quality control, package screening, and safety screening, or may be a medical imaging system. In the illustrated embodiment, system 30 is an X-ray medical imaging system such as a radiography or C-arm imaging system. In regards to the configuration of system 30, it may be similar in design to the generalized imaging system 10 described with respect to FIG. 1. For example, the system 30 includes a controller 20 operatively connected to the DAS 16, which allows the controlled acquisition of image data via an X-ray detector assembly 12.

In system 30, to enable the collection of image data, the controller 20 is also operatively connected to a source of X-rays 32, which may include one or more X-ray tubes or solid-state X-ray emission devices. The controller 20 may furnish a variety of control signals, such as timing signals, imaging sequences, and so forth to the X-ray source 32 via a control link 34. In some embodiments, the control link 34 may also furnish power, such as electrical power, to the X-ray source 32 via control link 34. Generally, the controller 20 will send a series of signals to the X-ray source 32 to begin the emission of X-rays 36, which are directed towards a subject of interest, such as a patient 38. The controller may also modify aspects of the operation of the detector assembly 12 and synchronize acquisition of signals at the detector assembly 12 with the X-ray source 32 operation. Various features within the patient 38, such as tissues, bone, etc., will attenuate the incident X-rays 36. The attenuated X-rays 40, having passed through the patient 38, then strike the detector assembly 12 to produce electrical signals representative of a corresponding data scan (i.e., an image). In various embodiments, the detector assembly 12 may include a flat, large-area light imager panel suitable for detecting optical photons generated by a scintillating material (e.g., cesium iodide (CsI) or gadolinium oxysulfide (GOS)) when exposed to higher energy radiation (e.g., X-rays). In certain implementations (such as digital X-ray applications), the detector assembly 12 (and the included large area light imager panel) may measure from 13 cm×13 cm up to 43 cm×43 cm.

Large-area light imager panels are typically manufactured in 8" or 12" wafer form factors. However the single-chip imager sizes (i.e., imager chip sizes) are typically limited to less than ~10 cm×12 cm when using 8" wafer fabrications or to less than ~20 cm×20 cm when using 12" wafer fabrications to produce CMOS imager wafers. Therefore, in order to produce large-area light imager panels used in many X-ray applications, smaller imaging chips may be mechanically tiled together to form the desired size of imager panel. Such mechanical tiling processes may be susceptible to moisture incursion, which may be problematic in contexts where a hygroscopic scintillating material, such as CsI, is employed. Further, as discussed herein, in certain implementations it may also be desirable to form electrical interconnections between the mechanically tiled chips.

With respect to the mechanical tiling of the imager chips when creating a larger assembly, it may be desirable to mechanically align and tile the imager chips so as to minimize the physical gap a between imager chips, thereby also minimizing the non-functional space or line between the chips. For example, it may be desirable to have a gap between imager chips that is no greater in width than one pixel pitch, i.e., a single defective line in the light or X-ray image. Further, as discussed herein, a mechanically tiled imager panel in accordance with the present disclosure may be sealed against moisture and the environment (such as by use of a moisture-impermeable epoxy along joints and seams), thereby improving the useful life of any material, such CsI, whose physical characteristics could degrade when exposed to such conditions.

With respect to the potential electrical interconnection between chips, it may be desirable to physically connect the two addressing-lines on any two imager chips so that they are electrically connected together and can, therefore, be handled as a single entity during readout processes. This electrically connecting technology may be referred as "electrical-tiling". For example, a 2×2 tiled chip does not require electrical-tiling if there are 4 sets of either "on-chip" or "off-chip" readout electronics attached to each of the 4 chips (i.e., a respective set of readout electronics for each chip). The "on-chip" readout electronics context refers to instances where the readout electronics is made on the same 8" or 12" silicon wafer of the light imager chip whereas the "off-chip" readout electronics context refers to instances where the readout electronics is made on a different 8" or 12" silicon wafer from that of the light imager chip. However, electrical-tiling as discussed herein will cut the needed readout electronics by half and result in significant net saving in detector cost and/or complexity in most cases.

Figure 3:
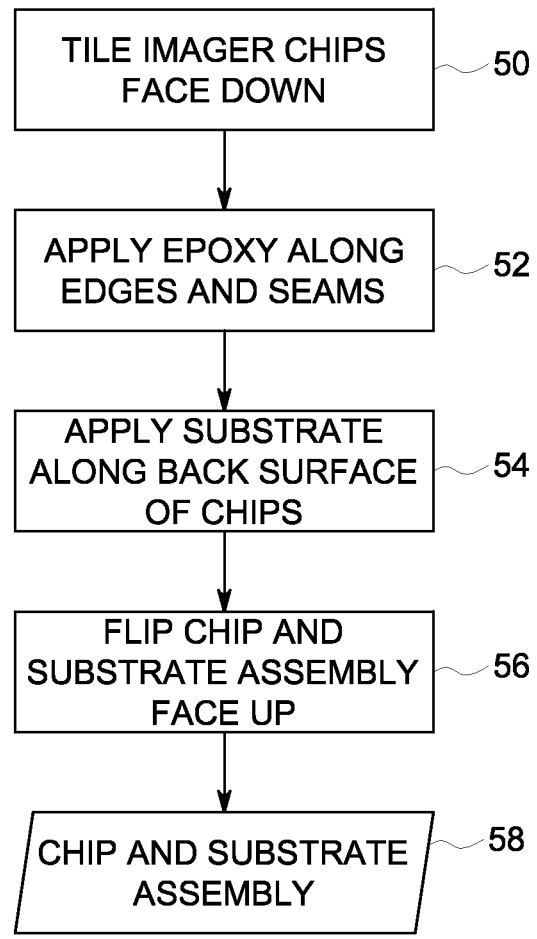
FIG. 3 is a process flow diagram illustrating formation of a chip and substrate assembly, in accordance with an aspect of the present disclosure.

With the foregoing in mind, FIG. 3 depicts a process flow for producing a tiled imager chip assembly in accordance with one implementation. In accordance with this implementation, the imager chips to be tiled are arranged face-down (block 50) (i.e., active or light-sensitive surface facing down) in the tiled arrangement. An epoxy is applied along the edges and seams (block 52) of the image chips. In certain embodiments, such as where a hygroscopic scintillator material (e.g., CsI) will be employed, the epoxy may be moisture-impermeable. In other embodiments, such as where the scintillator material employed is non-hygroscopic (e.g., GOS), the epoxy employed may not be moisture-impermeable. A substrate is then applied (block 54) to the back of the imager chips on top of the epoxy. The assembly 58 comprising the substrate, epoxy, and imager chips can then be flipped (block 56) face-up (i.e., active or light-sensitive surface facing up) for further processing, as discussed herein.

Figure 4:
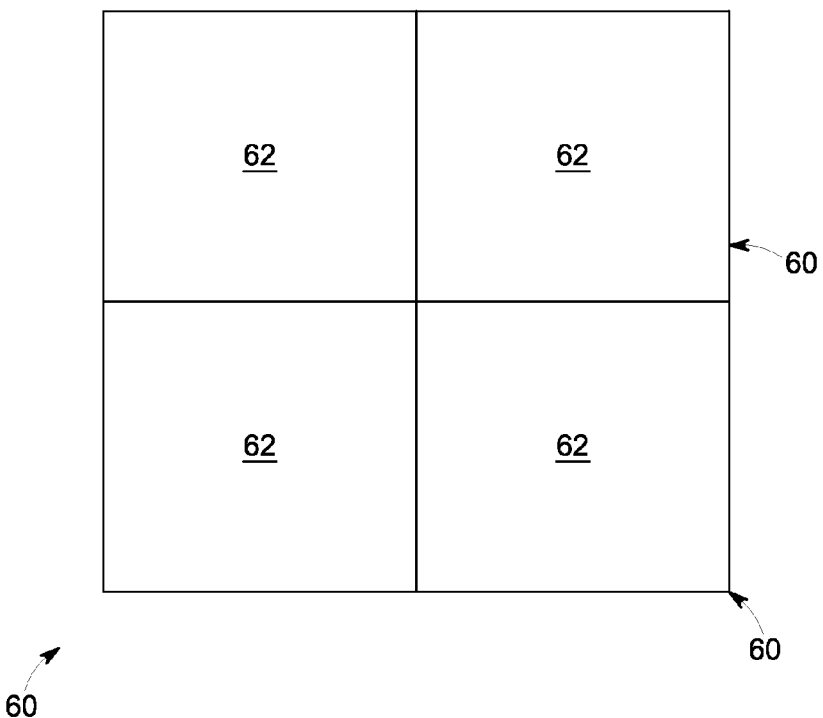
FIG. 4 depicts a set of imager chips tiled face down, in accordance with an aspect of the present disclosure.

Turning to FIGS. 4-7, the steps of this "face-down" assembly process are depicted graphically. Turning to FIG. 4, a back surface 62 of each imager chip 60 is arranged face up in 2×2 tiled arrangement in which little or no gap is left between imager chips 60. In one embodiment, each imager chip 60 is an amorphous silicon (A-Si) chip having a photo-detecting surface (i.e., the front or active surface 82) and a non-photo-detecting surface (i.e., the back or inactive surface 62). In accordance with the present "face-down" tiling approach, the light-sensing surfaces (i.e., the front surfaces) of the imager chips 60 are flat on a supporting surface, allowing production of a larger tiled-panel having an optically flat light-sensing surface. Such an optically flat light-sensing surface may, in accordance with present embodiments, allow seamless application of an X-ray scintillator material, such as CsI or GOS, to the light sensing surface of the detector panel.

As will be appreciated, the imager chips 60 being tiled may differ based on what edges, if any, are provided with readout electronics. In particular, each of the respective imager chips 60 may not interchangeable with (i.e., identical to) one another due to the asymmetries associated with the placement of the readout electronics. That is, the presence and/or location of read-out electronics on the various edges of the imager chips 60 may translate into certain of the imagers chips 60 being distinct from one another (i.e., not interchangeable with one another) while other imager chips 60 may be generally identical, but rotated, with respect to one another.

Figure 5:
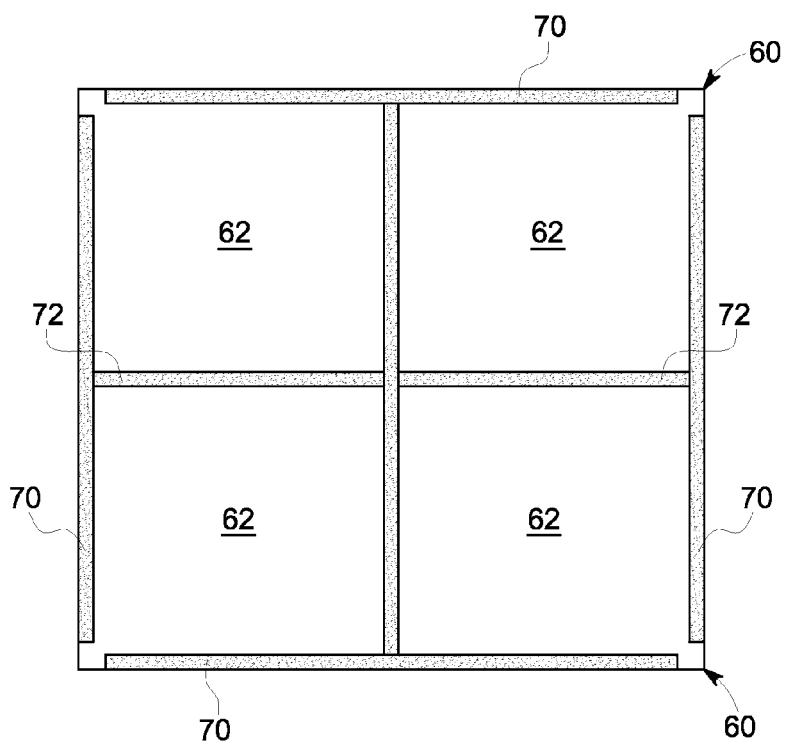
FIG. 5 depicts the tiled imager chips of FIG. 4 after application of epoxy, in accordance with an aspect of the present disclosure.

Turning to FIG. 5, an epoxy is printed or otherwise applied along the perimeter (perimeter epoxy 70) of the tiled imager chip assembly. In certain implementations, a space may be left at the corners or at other locations on the perimeter to allow air to escape when a substrate is adhered to the epoxy. In the depicted embodiment, an epoxy is also applied along the inner seams (seam epoxy 72) between tiled imager chips 60. In one embodiment, such as where a hygroscopic scintillator material is to be employed, the epoxy (e.g., seam epoxy 72) may be a moisture-impermeable epoxy suitable for forming a hermetically sealed environment for the scintillator material. In other embodiments, such a where the scintillator material to be employed is not hygroscopic, the epoxy need not be moisture-impermeable.

The perimeter epoxy 70 allows attachment of a substrate (e.g., supporting plate) to the tiled imager chips 60, as discussed below. In addition, the perimeter epoxy 70 may also serve the function of supporting the edges of the imager chips 60 during bonding (such as anisotropic conductive film (ACF) bonding) to the readout electronic modules. The seam epoxy 72 may also facilitate attachment of the tiled imager chips 60 to a substrate, and may, if a moisture-impermeable epoxy is employed, form a moisture seal between the tiled imager chips 60 to prevent moisture from leaking through from the back-side of the tiled imager chip panel.

Figure 6:
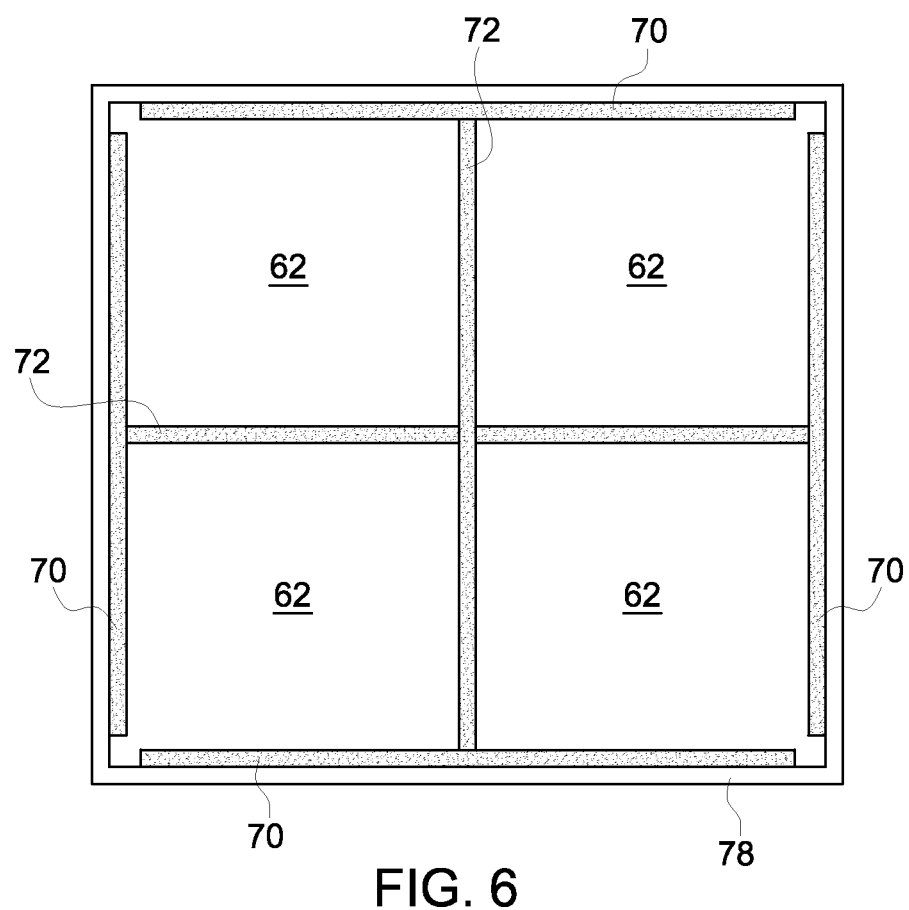
FIG. 6 depicts the tile imager chips and epoxy of FIG. 5 after application of a support plate, in accordance with an aspect of the present disclosure.
Figure 7:
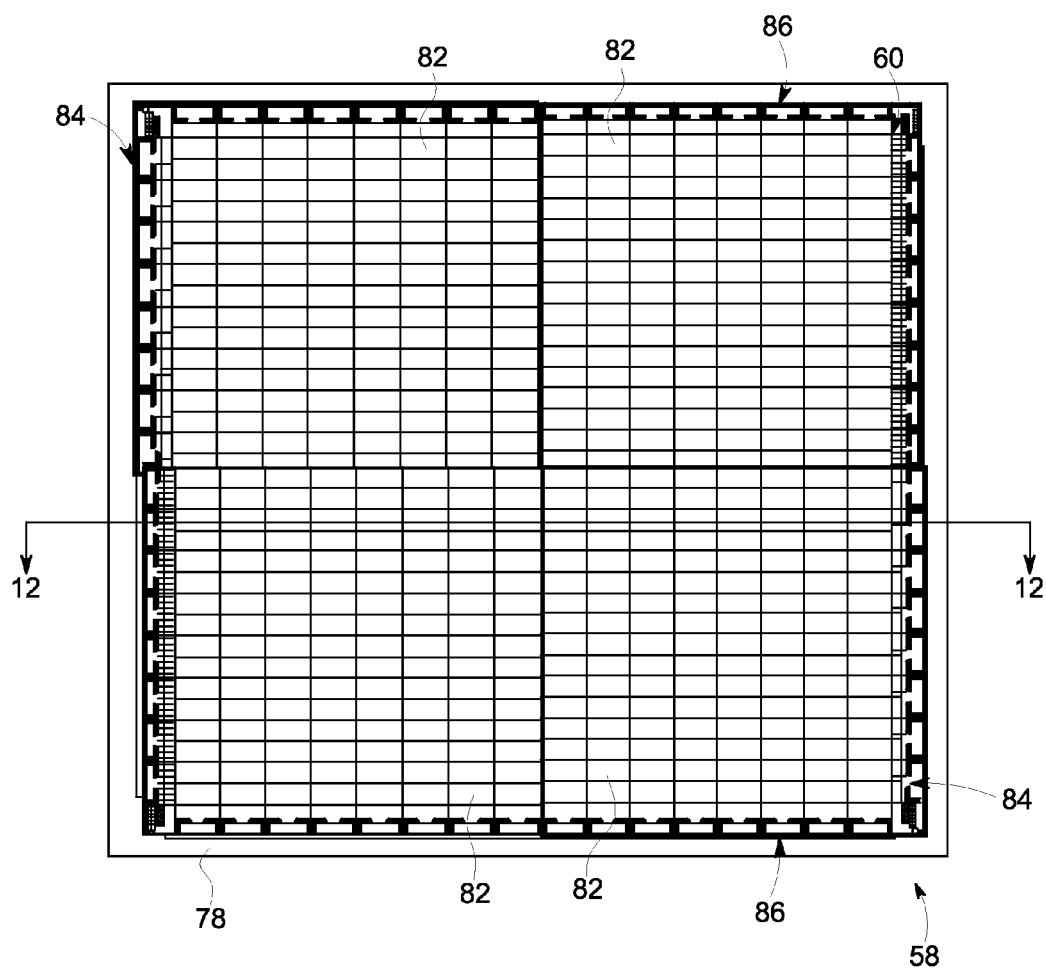
FIG. 7 depicts the mechanically tiled imager panel of FIG. 6 after being flipped, in accordance with an aspect of the present disclosure.

Turning to FIG. 6, in one embodiment a substrate 78 is applied to the perimeter epoxy 70 and the seam epoxy 72, thereby securing the imager chips 60 to the substrate 78. In one implementation, the substrate 78 may be a glass, ceramic, plastic, or metal plate, though the substrate 78 may also be formed from other suitable materials. Once the epoxy is cured (such as by application of heat or UV light), the chip and substrate assembly may be flipped over, as depicted in FIG. 7, exposing the front surface 82. In the depicted example of FIG. 7, the respective imager chips 70 include respective readout electronics in the form of scan fingers 84 (for electrical interconnection with scan lines) and data fingers 86 (for electrical interconnection with data lines). As will be appreciated the respective scan lines and data lines may be used in combination to control readout of the detector panel assembly 12.

Figure 8:
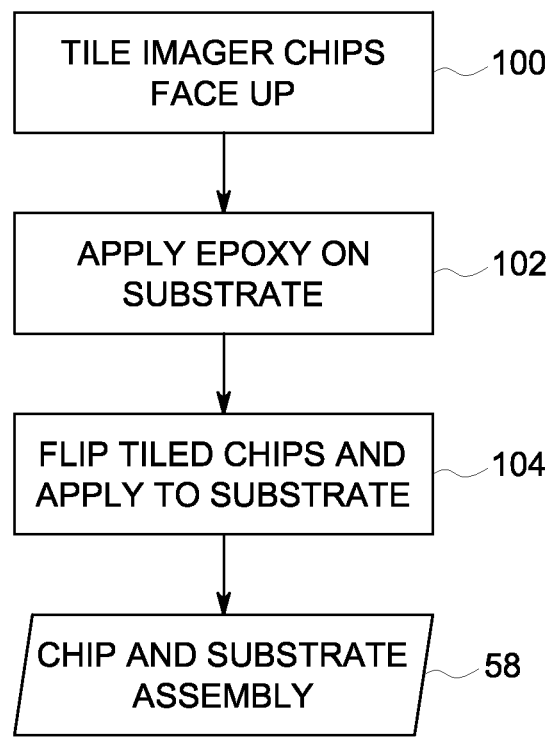
FIG. 8 is a process flow diagram illustrating formation of a chip and substrate assembly, in accordance with a further aspect of the present disclosure.

While the preceding discussion relates to a "face-down" approach for producing a chip and substrate assembly, FIG. 8 depicts a process flow diagram describing a "face-up" approach for producing a chip and substrate assembly. In accordance with this implementation, the imager chips to be tiled are arranged face-up (block 100) (i.e., active or light-sensitive surface facing up) in the tiled arrangement. An epoxy (moisture-impermeable or otherwise) is applied to a substrate in locations corresponding to imager chips edges and seams (block 102). The tiled imager chips are flipped and applied (block 104) to the substrate having the epoxy at the corresponding imager chip edge and seam locations. The assembly 58 comprising the substrate, epoxy, and imager chips is thereby formed and is ready for further processing as discussed herein.

Figure 9:
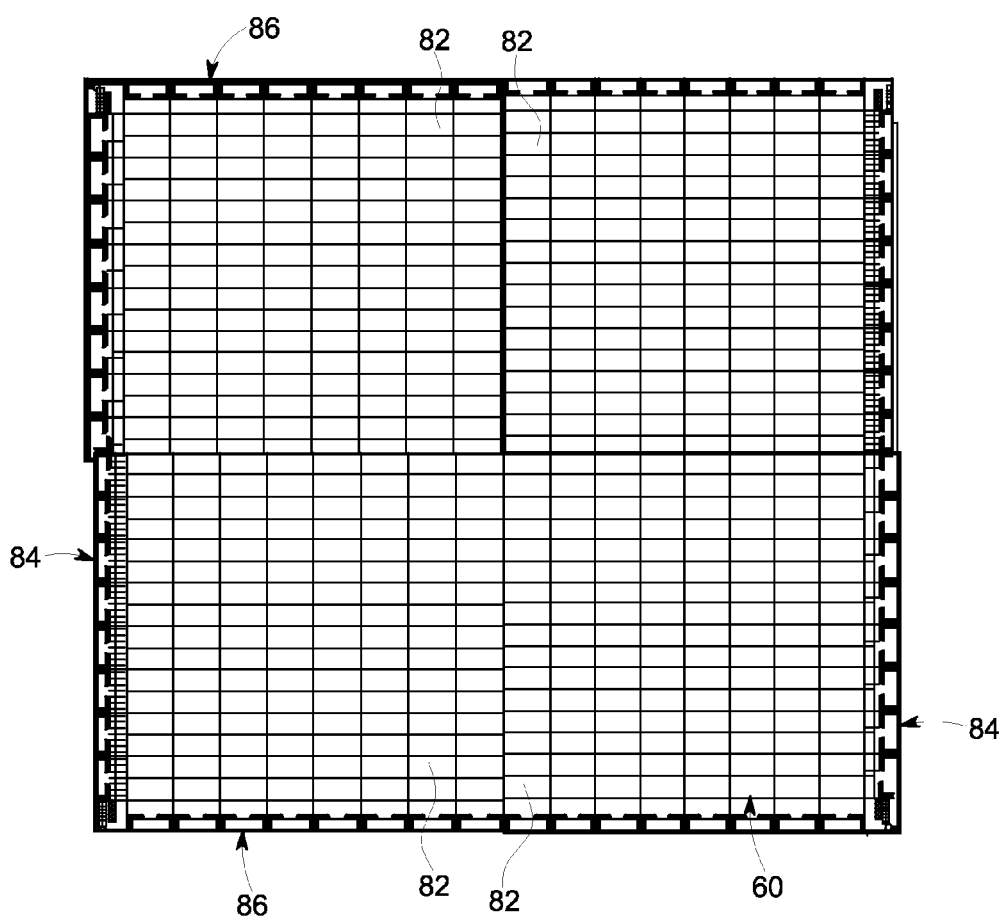
FIG. 9 depicts a set of imager chips tiled face up, in accordance with an aspect of the present disclosure.
Figure 10:
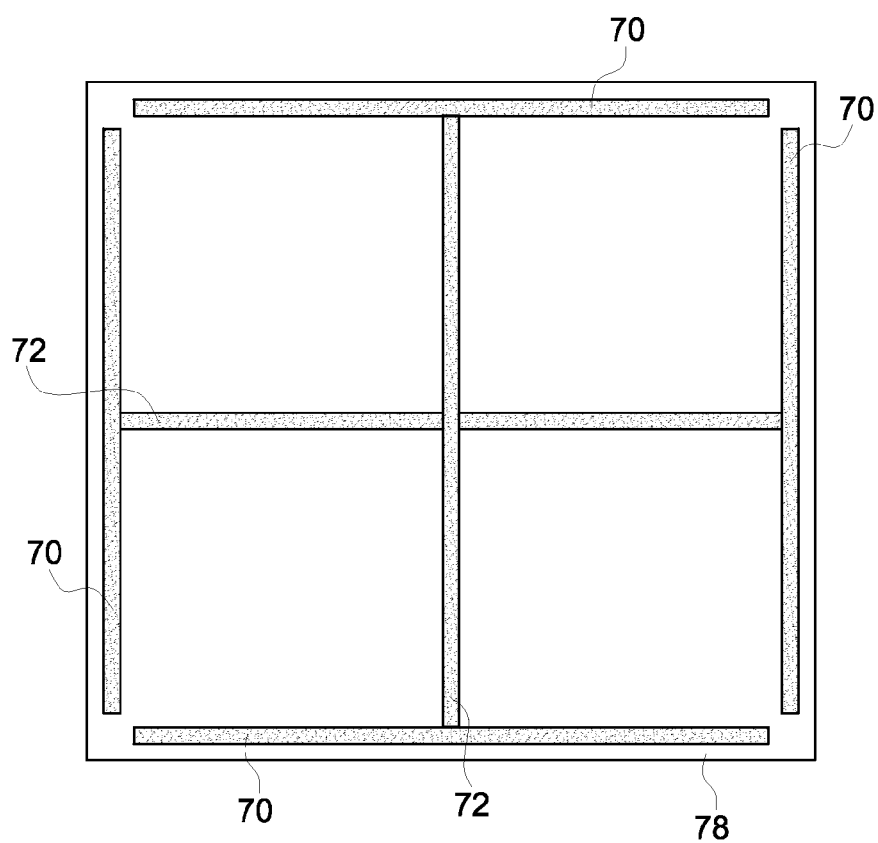
FIG. 10 depicts a support plate with epoxy applied, in accordance with an aspect of the present disclosure.
Figure 11:
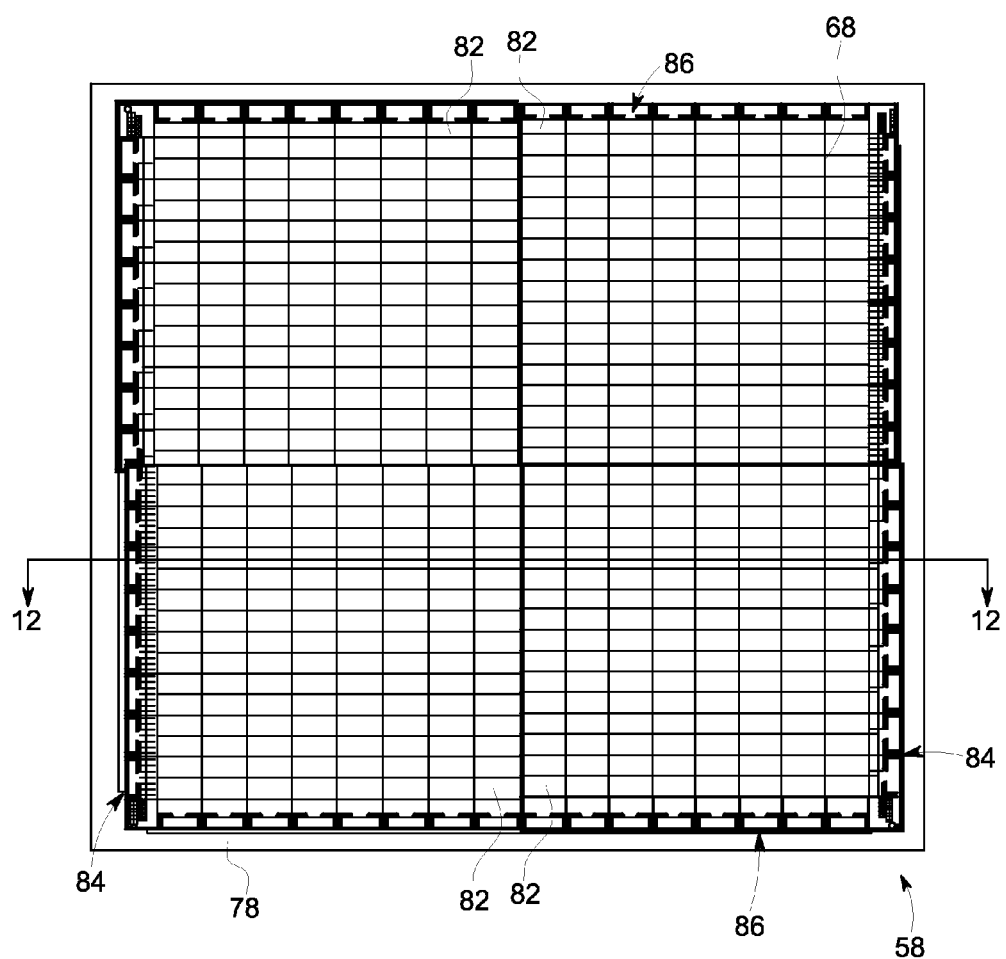
FIG. 11 depicts the tiled imager chips of FIG. 9 applied to the support plate and epoxy of FIG. 10, in accordance with an aspect of the present disclosure.

Turning to FIGS. 9-11 the steps of this "face-up" assembly process are depicted graphically. Turning to FIG. 9, in the depicted example the imager chips 60 are arranged face-up in a 2×2 tiled formation in which little or no gap is left between imager chips 60. In accordance with the present "face-up" tiling approach, the light-sensing surfaces (i.e., the front surfaces) and readout electronics of the imager chips 60 are visible and, thus, may be precisely aligned with one another. As noted above, the imager chips 60 being tiled may differ based on what edges, if any, are provided with readout electronics. In particular, each of the respective imager chips 60 may not interchangeable with (i.e., identical to) one another due to the asymmetries associated with the placement of the readout electronics (i.e., scan fingers 84 and data fingers 86).

Turning to FIG. 10, an epoxy is printed or otherwise applied to a substrate 78 at locations corresponding to the perimeter and seams associated with the tiled imager chips 60. In the depicted example, epoxy is applied along a perimeter (perimeter epoxy 70) corresponding to the tiled imager chips and at locations corresponding to the inner seams (seam epoxy 72) between the tiled imager chips 60. In one embodiment, the epoxy (such as the seam epoxy 72) is moisture-impermeable and forms a moisture-impermeable seal between the tiled imager chips 60. In other embodiments, the epoxy need not be moisture-impermeable. In certain implementations, a space may be left at the corners or at other locations on the perimeter to allow air to escape when the tiled imager chips are adhered to the epoxy.

Turning to FIG. 11, in one embodiment the tiled imager chips 60 are applied to the substrate 78 on which the perimeter epoxy 70 and the seam epoxy 72 are present, thereby securing the imager chips 60 to the substrate 78. For example, in one implementation, a vacuum chuck may be used to simultaneously pick up the 2×2 tiled imager chips 60 and to place the tiled imager chips on the top of the epoxy on the substrate 78. In certain implementations, a planar surface or weight may be employed after placing the tiled imager chips 60 on the epoxy 70, 72 to obtain an optically flat surface for the tiled assembly. Once the epoxy is cured (such as by application of heat or UV light), the chip and substrate assembly may be used in subsequent processing steps, as discussed herein.

Figure 12:
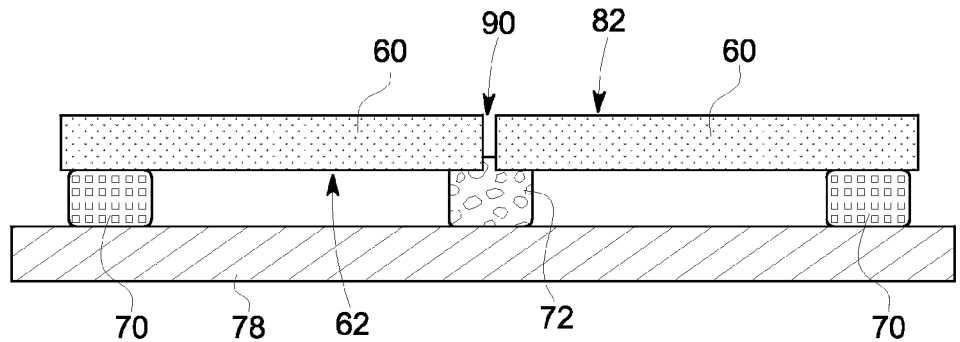
FIG. 12 depicts a cross-section taken along view line 12 of FIGS. 7 and 11, in accordance with an aspect of the present disclosure.

Turning to FIG. 12, a cross-sectional view, as seen from view line 12 of FIGS. 7 and 11, is provided. This cross-sectional view is representative of both the face-down and face-up chip and substrate assembly processes discussed herein. As seen in FIG. 12, the substrate 78, as seen in sectional view, is attached to the tiled imager chips 60 via lines of perimeter epoxy 70 at the perimeter of the tiled imager chips and by lines of seam epoxy 72 along the interior seams of the tiled imager chips 60. In the depicted example, the respective imager chips 60 are depicted as being different thicknesses, such as due to variability or tolerances within the manufacturing process for the imager chips 60. As depicted, the epoxy 70, 72, can account or accommodate for these variations in thickness of the imager chips 60 so as to provide an optically flat surface of the assembly of tiled imager chips 60.

In one embodiment, the groove 90 between the respective tiled imager chips 60 is approximately 20 μm wide, i.e., the tiled imager chips 60 are separated by about 20 μm at their respective interior edges. A typical pixel width is between about 50 μm to about 200 μm. Further, in one embodiment the height of the seam epoxy 72 relative to the front surface 82 of the imager chips 60 may be between about 20 μm to about 50 μm below the front surface 82. That is the groove 90 may be between about 20 μm-50 μm deep in such an embodiment. In the depicted example, there is no electrical interconnection between the respective imager chips 60 across the groove 90.

Figure 13:
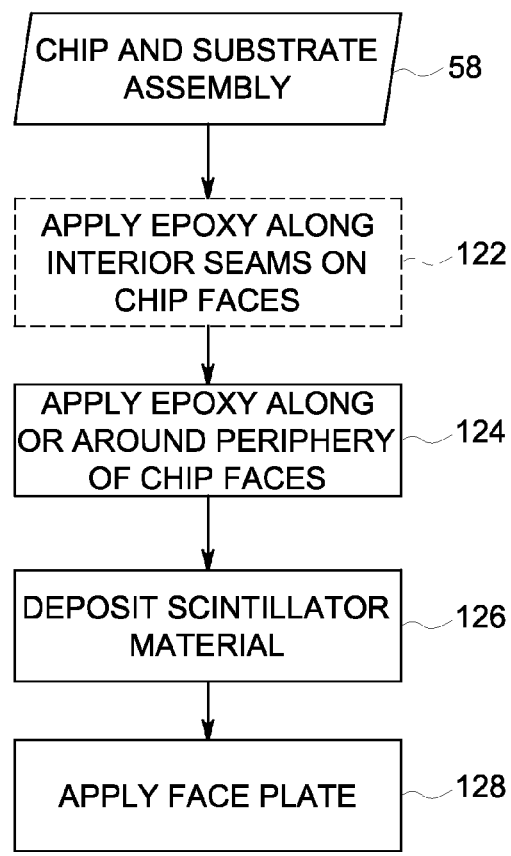
FIG. 13 is a process flow diagram illustrating formation of a detector panel, in accordance with an aspect of the present disclosure.

Turning to FIG. 13, a process flow diagram is depicted describing subsequent processing of the chip and substrate assembly 58. In the depicted process flow example, an optional step of applying (block 122) epoxy along the interior seams formed by the front surfaces 82 of the tiled imager chip assembly is performed. Epoxy is applied (block 124) along or around the periphery of the front surface of the tiled imager chip assembly. A scintillator material (e.g., CsI) is applied (block 126) to the front surface of the tiled imager chips 60 and a face plate is applied (block 128) over the scintillator material so as to adhere to the epoxy applied to the front surface of the chip and substrate assembly 58.

Figure 14:
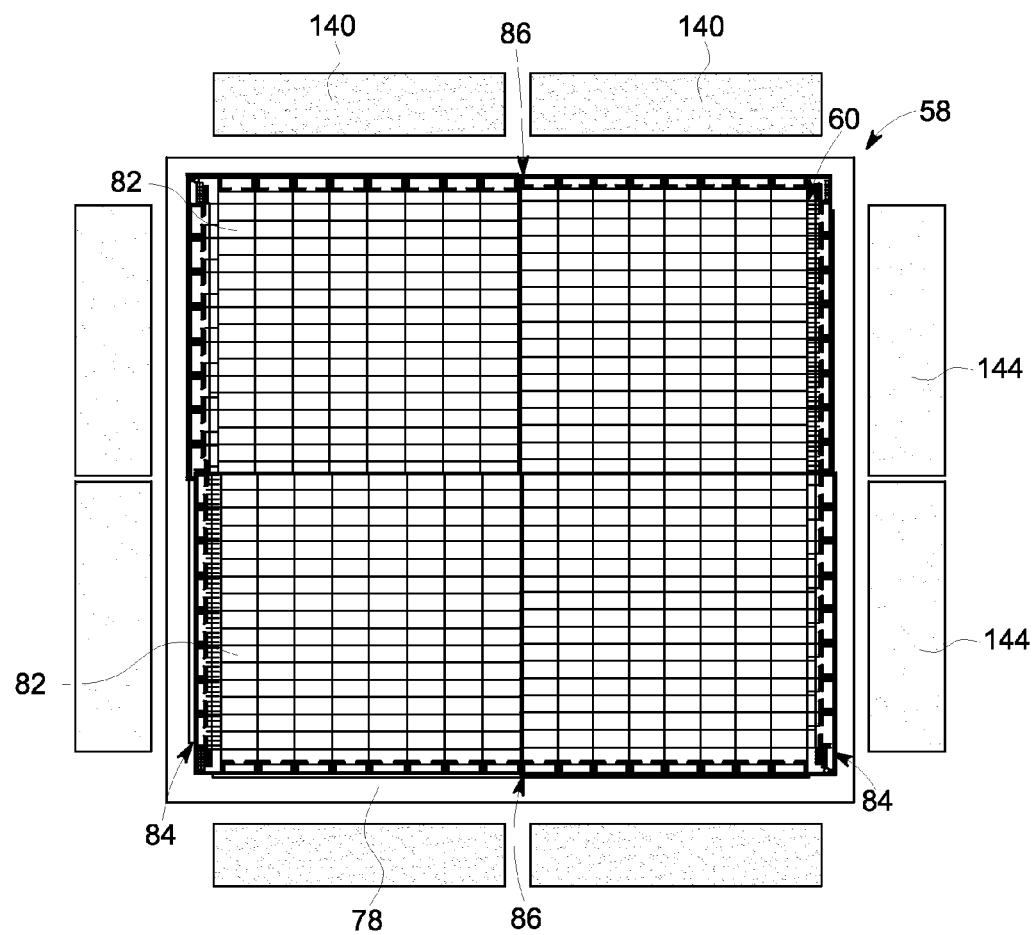
FIG. 14 depicts a tiled chip and substrate assembly, in accordance with an aspect of the present disclosure.

Turning to FIG. 14, a chip and substrate assembly 58 is depicted in conjunction with data modules 140 and scan modules 144 that, respectively, electrically connect to data fingers 86 and scan fingers 84. In the depicted example, one scan module 144 and one data module 140 is attached to each imager chip 60. As discussed in greater detail below, in embodiments in which imager chips 60 are electrically connected or bridged, the number of data module 140 and scan modules 144 may be reduced.

Figure 15:
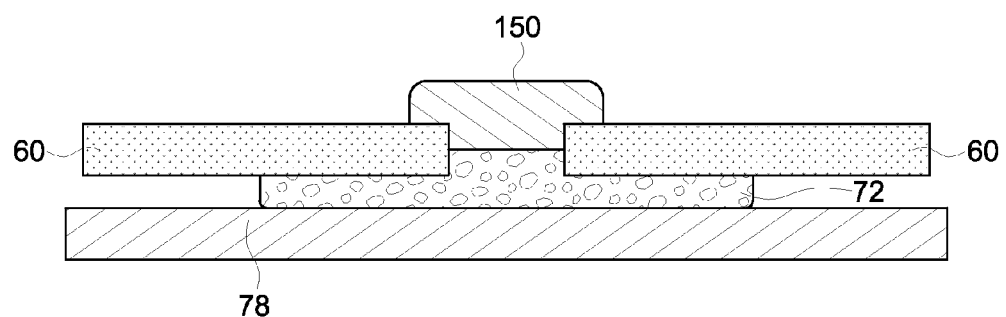
FIG. 15 depicts a cross-section of an imager chip junction after application of a filler material to a gap between the imager chips, in accordance with an aspect of the present disclosure.
Figure 16:
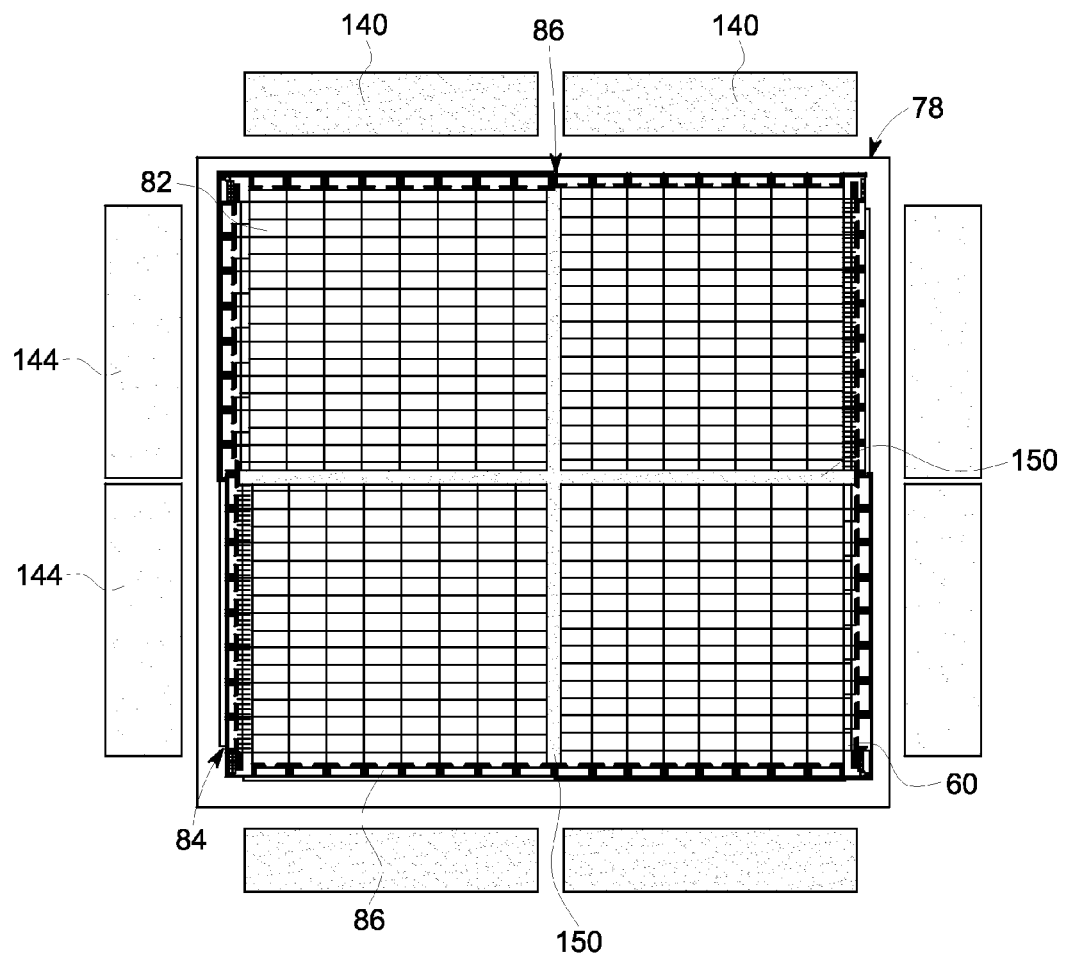
FIG. 16 depicts a plan view of a tiled imager chip assembly with a filler material applied to a gap between the imager chips, in accordance with an aspect of the present disclosure.

Turning to FIGS. 15 and 16, in one implementation, the groove 90 at the interior seams between the tiled imager chips 60 may be filled with a suitable polymer 150, such as a thermal or UV cured epoxy or other organic film stripe or polymer. Such a fill process may provide a substantially smooth surface for the tiled imager chip assembly prior to scintillator deposition and may prevent or reduce image artifacts near the tiling seam. In one such embodiment, the polymer 150 would not extend above the trench 90 (i.e., the top surface of the polymer 50 would coincide with the front surface 82 of the imager chips 60) or would protrude beyond the front surface 82 of the imager chips 60 less than 10 μm. In other embodiments, the polymer 150 is not applied at the interior seams of the tiled imager chips 60.

Figure 17:
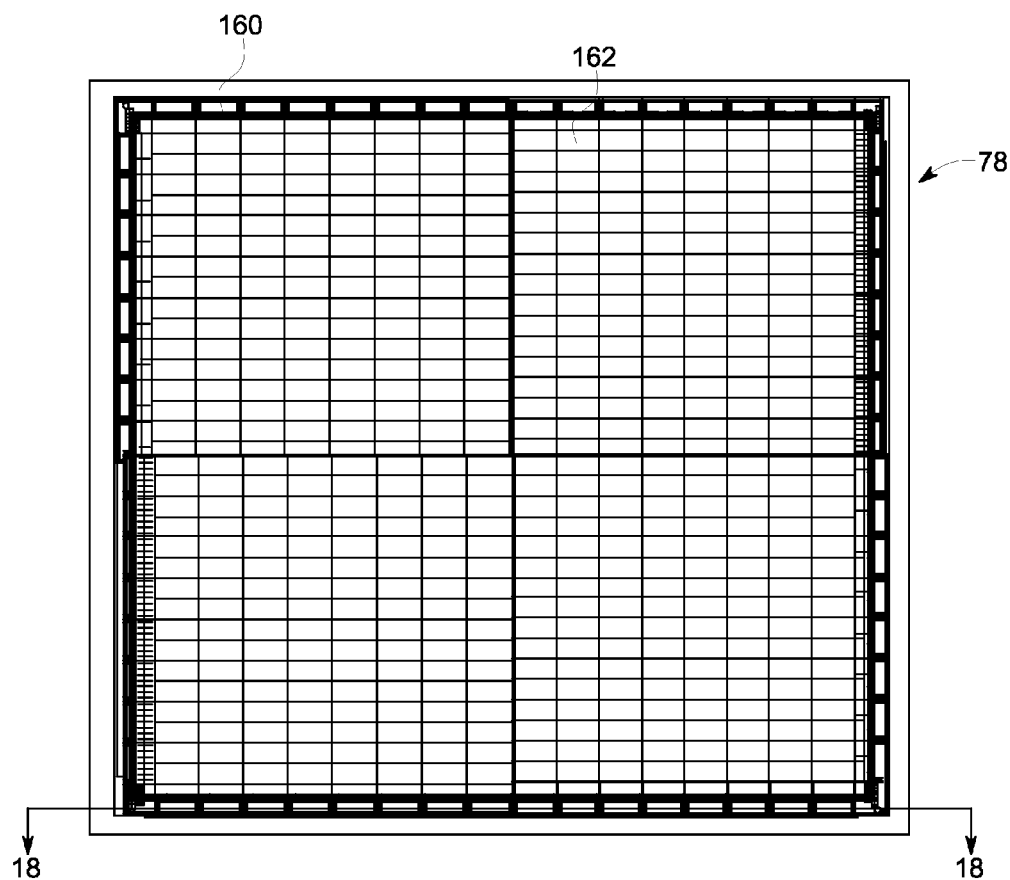
FIG. 17 depicts a tiled imager chip assembly after deposition of scintillator material and application of an epoxy ring to a gap between the imager chips, in accordance with an aspect of the present disclosure.
Figure 18:
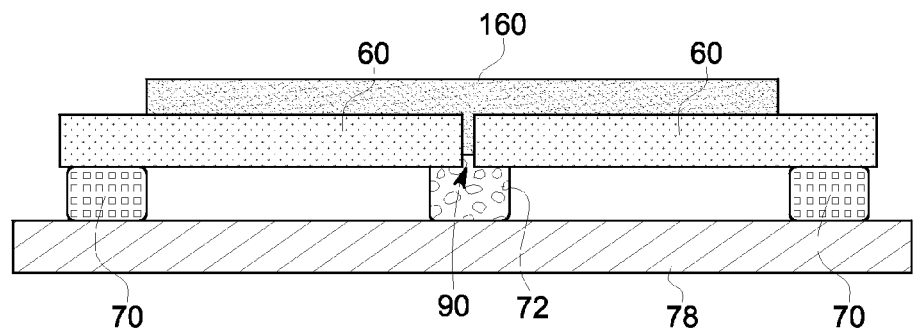
FIG. 18 depicts cross-section taken along view line 18 of FIG. 17, in accordance with an aspect of the present disclosure.

Turning to FIGS. 17 and 18, in one implementation a closed epoxy ring 160 is printed or otherwise applied about the perimeter of the tiled imager chips 60. In embodiments where a hygroscopic scintillator material 162 (e.g., CsI), will be applied, the epoxy may be a moisture-impermeable epoxy. Conversely, in embodiments where a non-hygroscopic scintillator material 162 (e.g., GOS), will be applied, the epoxy need not be moisture-impermeable. In one embodiment the epoxy ring 160 is formed by a line of epoxy that is about 2 mm-3 mm wide and is about 4 mil-20 mil (~0.01 mm-~0.5 mm) thick.

In addition, a layer of scintillator material 162 (e.g., CsI) is deposited on the front surfaces 82 of the imager chips 60. In one embodiment, the layer of scintillator material 162 is between about 300 μm to about 1,000 μm thick.

In one embodiment, the epoxy ring 160 surrounds the scintillator material 162 along the planar front surface defined by the tiled imager chips 60 and serves as a gasket to protect the scintillator material 162, such as from moisture. In certain implementations, the epoxy ring 160 is separated from the scintillator material by a gap, such as a gap about 5 mm wide. As depicted in the cross-section representation depicted in FIG. 18, at the juncture formed between the imager chips 60, i.e., groove 90, the epoxy from the epoxy ring 160 joins with and forms a hermetic seal with the underlying seam epoxy 72 in those embodiments where both epoxy materials are moisture-impermeable.

Figure 19:
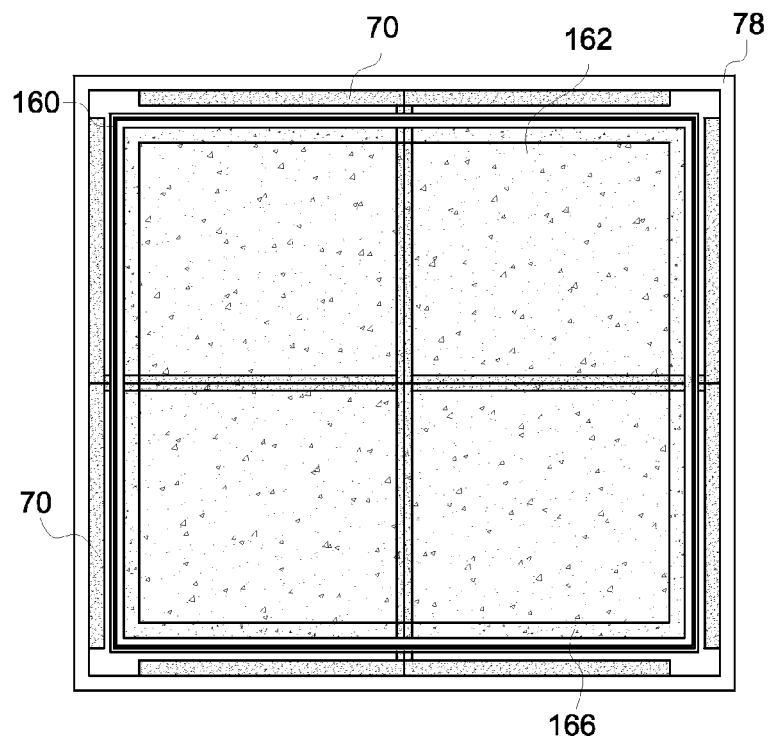
FIG. 19 depicts the tiled imager chip assembly of FIG. 17 after application of a radiation transparent face plate, in accordance with an aspect of the present disclosure.

Turning to FIG. 19, a face plate 166 is affixed to the epoxy ring 160, thereby covering the scintillator material 162. The face plate 166, in conjunction with the imager chips 60 and various epoxy applications, forms a hermetically sealed space for the scintillator material 162 in those embodiments where both epoxy materials are moisture-impermeable. In one embodiment, the face plate is low X-ray attenuation cover plate formed from aluminum and graphite, such as a plate of aluminum clad or coated graphite.

Figure 20:
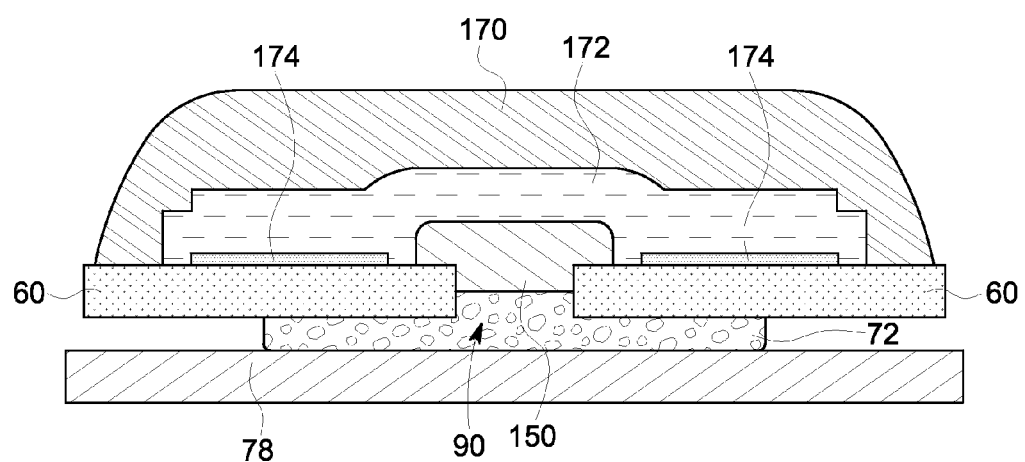
FIG. 20 depicts a cross-section of an imager chip junction bridged by a conductive material, in accordance with an aspect of the present disclosure.

While the preceding discussion has focused on imager chips 60 that are not electrically connected, and thus are read out and controlled separately, in other implementations the imager chips may be electrically connected (i.e., electrically tiled) in addition to being mechanically tiled. For example, turning to FIG. 20, a cross-section of a junction between two mechanically-tiled imager chips 60 is depicted. In accordance with this embodiment, a contact pads 174 (e.g., aluminum pads) on each imager chip 60 are electrically connected, such as by direct writing or otherwise depositing a conductive material 172 or line (e.g., aluminum or copper) to form an electrical connection between the respective imager chips 60. In the depicted example, the conductive material 172 is applied over a polymer or epoxy material 150 that is dielectric and that is used to fill the gap 90. In one embodiment, the conductive material 172 is applied by direct writing metallic stitches or shorting bars between the pads 174 on the respective imager chips 60. In the depicted example, a dielectric layer 170 is applied over the conductive material 172 to provide passivation. In this manner, scan lines and/or data lines of two different imager chips 60 may be made continuous.

Figure 21:
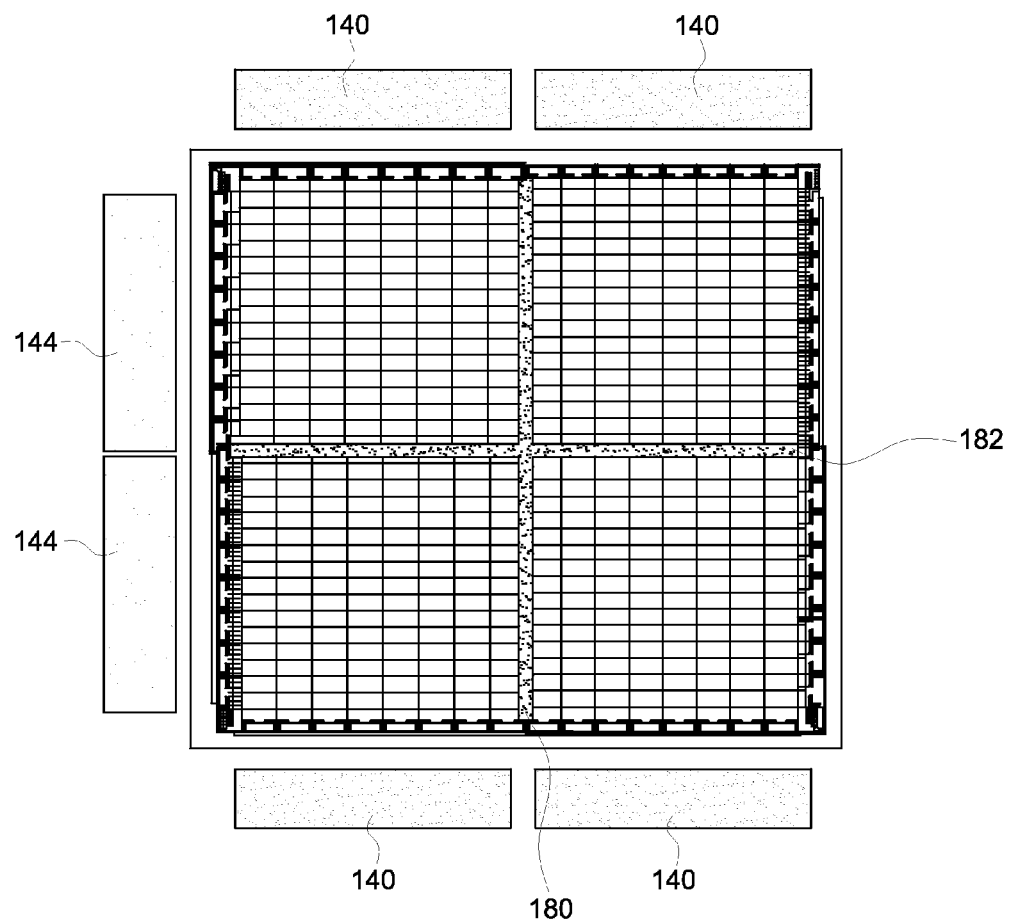
FIG. 21 depicts an embodiment of a tiled detector panel having electrically bridged scan lines, in accordance with an aspect of the present disclosure.

By way of further example, and turning to FIG. 21, a depiction is provided of tiled imager chips 60 where the scan lines are electrically connected or tiled between respective imager chips 60, as signified by conductive bridge 180. In this example, the data lines of the respective imager chips 60 are not electrically connected, as indicate by the non-conductive gap or material 182. Because of the electrical bridging between the scan lines of the respective imager chips 60, each pair of bridged imager chips 60 can be handled or read-out by a single scan module 144, i.e., only one scan module 144 is needed for each row of imager chips 60. Conversely, because the data lines of the imager chips 60 are not electrically bridged, a respective data module 140 is needed to read-out each respective imager chip 60, i.e., each column of imager chips 60 needs two data modules 140 for read-out, one for each imager chip 60 in the column. In such an embodiment, pixels of the detector panel can extend all the way to an edge of the panel (here the right edge of the panel) since readout electronics are not needed at that edge.

Figure 22:
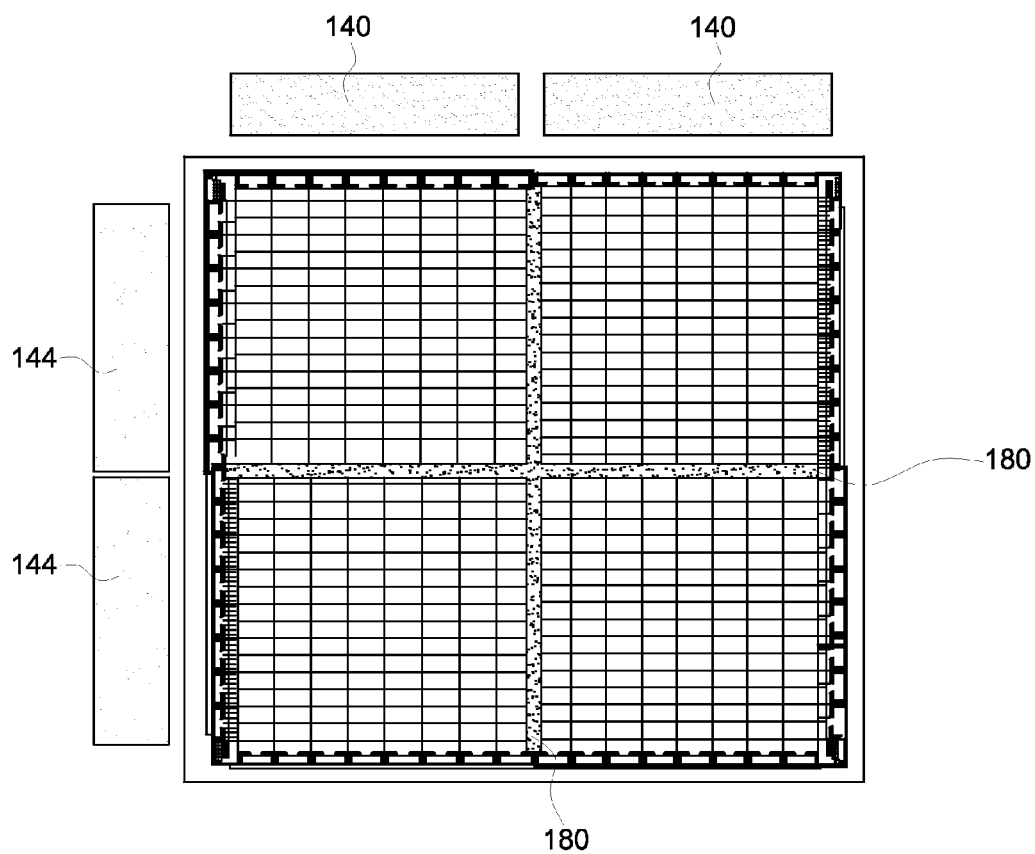
FIG. 22 depicts an embodiment of a tiled detector panel having electrically bridged scan lines and data lines, in accordance with an aspect of the present disclosure.

Turning to FIG. 22, in a further example data lines and scan lines of adjacent imager chips 60 are electrically bridged or otherwise connected, as indicated by respective conductive bridges 180. Because of the electrical bridging between the scan lines of the respective imager chips 60, each pair of bridged imager chips 60 can be handled or read-out by a single scan module 144, i.e., only one scan module 144 is needed for each row of imager chips 60. Similarly, because of the electrical bridging between the data lines of the respective imager chips 60, each pair of bridged imager chips 60 can be handled or read-out by a single data module 140, i.e., only one data module is needed for each column of imager chips 60. In such an embodiment, pixels of the detector panel can extend all the way to two edges of the panel (here the right and bottom edges of the panel) since readout electronics are not needed at those edges. Note that "off-chip" readout electronics (i.e., "off-chip" scan modules 144 and data modules 140) are depicted in FIGS. 14, 16, 21, and 22 for simplicity of illustration. However, in other embodiments, the readout electronics (i.e., the scan and data circuits or modules) may be fabricated "on-chip", i.e., on the same silicon of the imager chips.

Technical effects include production of a detector panel comprising multiple tiled imager chips with a gap between the imager chips that is one pixel wide or less. In addition, a further technical effect is the production of a detector panel comprising multiple tiled imager chips where the scintillator material is hermetically sealed. Further, a technical effect is the production of a detector panel comprising multiple tiled imager chips where the data lines and/or scan lines of the separate imager chips are electrically contiguous.

This written description uses examples to disclose the present approach, including the best mode, and also to enable any person skilled in the art to practice the disclosed subject matter, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for manufacturing a tiled detector panel is provided, comprising:
    positioning imager chips face-down in a tiled arrangement;
    applying an epoxy on a back surface of the imager chips at least along internal seams of the tiled arrangement of imager chips;
    applying a substrate to the epoxy on the back surface of the imager chips, wherein a respective unfilled space is defined for each imager chip between the substrate, the epoxy, and the back surface of the respective imager chip;
    applying a ring of epoxy on a front surface of the imager chips;
    depositing a scintillator material on the front surface of the imager chips; and
    applying a face plate to the ring of epoxy to form a sealed environment containing the scintillator material;
    wherein the epoxy applied on the back surface of the imager chips is also applied along a perimeter of the tiled arrangement of imager chips and wherein the epoxy applied along the perimeter further defines the respective unfilled spaces between the imager chips and substrate.

2. The method of claim 1, wherein at least the epoxy applied to the internal seams and forming the ring is a moisture-impermeable epoxy.

3. The method of claim 1, comprising:
applying a polymeric composition on the front surface of the imager chips so as to fill a groove between the imager chips prior to depositing the scintillator material.

4. The method of claim 1, comprising:
applying a conductive material over a dielectric spacer separating a first imager chip and a second imager chip adjacent to the first imager chip, wherein the conductive material electrically connects a first contact pad present on the first imager chip and a second contact pad present on the second imager chip so as to connect one or more scan lines of the first imager chip and the second imager chip; and
applying a dielectric layer over the conductive material to passivate the conductive material.

5. The method of claim 1, comprising:
applying a conductive material over a dielectric spacer separating a first imager chip and a second imager chip adjacent to the first imager chip, wherein the conductive material electrically connects a first contact pad present on the first imager chip and a second contact pad present on the second imager chip so as to connect one or more data lines of the first imager chip and the second imager chip; and
applying a dielectric layer over the conductive material to passivate the conductive material.

6. The method of claim 1, wherein the face plate comprises graphite and aluminum.

7. The method of claim 1, wherein a gap between the tiled imager chips is less than a pixel wide.

8. A method for manufacturing a tiled detector panel is provided, comprising:
positioning imager chips face-up in a tiled arrangement;
applying an epoxy on a substrate at locations corresponding to at least internal seams associated with the tiled arrangement of imager chips;
applying the tiled arrangement of imager chips to the epoxy on the substrate such that at least the internal seams of the tiled arrangement of imager chips are positioned on the epoxy, wherein a respective unfilled space is defined for each imager chip between the substrate, the epoxy, and the back surface of the respective imager chip;
applying a ring of epoxy on a front surface of the imager chips;
depositing a scintillator material on the front surface of the imager chips; and
applying a face plate to the ring of epoxy to form a sealed environment containing the scintillator material;
wherein the epoxy applied on the substrate is also applied at locations corresponding to a perimeter associated with the tiled arrangement of imager chips and wherein the epoxy applied along the perimeter further defines the respective unfilled spaces between the imager chips and substrate.

9. The method of claim 8, wherein at least the epoxy corresponding to the internal seams and forming the ring is a moisture-impermeable epoxy.

10. The method of claim 8, comprising:
applying a polymeric composition on the front surface of the imager chips so as to fill a groove between the imager chips prior to depositing the scintillator material.

11. The method of claim 8, comprising:
applying a conductive material over a dielectric spacer separating a first imager chip and a second imager chip adjacent to the first imager chip, wherein the conductive material electrically connects a first contact pad present on the first imager chip and a second contact pad present on the second imager chip so as to connect one or more scan lines of the first imager chip and the second imager chip; and
applying a dielectric layer over the conductive material to passivate the conductive material.

12. The method of claim 8, comprising:
applying a conductive material over a dielectric spacer separating a first imager chip and a second imager chip adjacent to the first imager chip, wherein the conductive material electrically connects a first contact pad present on the first imager chip and a second contact pad present on the second imager chip so as to connect one or more data lines of the first imager chip and the second imager chip; and
applying a dielectric layer over the conductive material to passivate the conductive material.

13. A detector panel, comprising:
a tiled arrangement of imager chips, the imager chips comprising a front surface and a back surface;
an epoxy applied:
to the back surfaces of the tiled arrangement of imager chips at least at the seams between the imager chips; and
on the front surfaces of the imager chips in a ring about the perimeter of the tiled arrangement of imager chips;
wherein the epoxy is also applied on the back surfaces of the imager chips at least partially along a perimeter of the tiled arrangement of imager chips;
a substrate attached to the tiled arrangement of imager chips by the epoxy applied to the back surfaces of the imager chips, wherein a respective unfilled space is defined for each imager chip between the substrate, the epoxy, and the back surface of the respective imager chip;
a face plate attached to the tiled arrangement of imager chips by the ring of epoxy applied to the front surfaces of the imager chips, wherein the face plate, the ring of epoxy, the epoxy applied to the seams, and the imager chips form a sealed environment; and
a scintillator material deposited on the front surface of the imager chips within the sealed environment.

14. The detector panel of claim 13, wherein the tiled arrangement of imager chips is separated by a gap that is less than one pixel wide.

15. The detector panel of claim 13, comprising a polymeric composition applied to the front surface of the tiled arrangement of imager chips so as to fill a gap between the tiled imager chips.

16. The detector panel of claim 13, comprising a conductive material spanning a dielectric spacer and connecting a first contact pad of a first imager chip and a second contact pad of a second imager chip adjacent to the first imager chip so as to connect one or more scan lines of the first imager chip and the second imager chip; and
a dielectric layer formed over the conductive material and passivating the conductive material.

17. The detector panel of claim 13, comprising
a conductive material spanning a dielectric spacer and connecting a first contact pad of a first imager chip and a second contact pad of a second imager chip adjacent to the first imager chip so as to connect one or more data lines of the first imager chip and the second imager chip; and a dielectric layer formed over the conductive material and passivating the conductive material.

18. The detector panel of claim 13, wherein the tiled imager chips are separated by about 20 μm or less.

19. The detector panel of claim 13, wherein at least one of the imager chips differs in thickness from the remainder of the imager chips.

* * * * *